(12) United States Patent
Riley et al.

(10) Patent No.: US 8,341,150 B1
(45) Date of Patent: Dec. 25, 2012

(54) FILTERING SEARCH RESULTS USING ANNOTATIONS

(75) Inventors: Patrick F. Riley, Palo Alto, CA (US); Ramanathan V. Guha, Los Altos, CA (US)

(73) Assignee: Google Inc., Mountain View, CA (US)

( * ) Notice: Subject to any disclaimer, the term of this patent is extended or adjusted under 35 U.S.C. 154(b) by 138 days.

(21) Appl. No.: 12/683,396

(22) Filed: Jan. 6, 2010

Related U.S. Application Data

(63) Continuation of application No. 11/382,452, filed on May 9, 2006, now Pat. No. 7,668,812.

(51) Int. Cl.
G06F 7/00 (2006.01)
G06F 17/30 (2006.01)

(52) U.S. Cl. ........................................ 707/728

(58) Field of Classification Search ........... 707/999.005, 707/728, 731
See application file for complete search history.

(56) References Cited

U.S. PATENT DOCUMENTS

| | | | |
|---|---|---|---|
| 6,012,053 A | 1/2000 | Pant et al. | |
| 7,165,080 B2 | 1/2007 | Kotcheff et al. | |
| 2005/0160107 A1 | 7/2005 | Liang | |
| 2005/0198076 A1 | 9/2005 | Stata et al. | |
| 2006/0026147 A1 | 2/2006 | Cone et al. | |
| 2007/0067305 A1* | 3/2007 | Ives | 707/10 |

OTHER PUBLICATIONS

Dave Taylor, How do I search my Gmail mailbox?, Apr. 29, 2005, (http://web.archive.org/web/20050429050101/http://www.askdavetaylor.com/how_do_i_search_my_gmail_mailbox.html).

Gmail, No more folders, filing or fumbling to find your mail, Jun. 7, 2004, (http://web.archive.org/web/20040607203827/gmail.google.com/gmail/help/learn_more.html).

* cited by examiner

*Primary Examiner* — Alexey Shmatov
(74) *Attorney, Agent, or Firm* — Fish & Richardson P.C.

(57) ABSTRACT

A search engine system accepts queries that include query terms and labels applicable to certain documents. A domain filter is constructed that is used to filter search results to certain domains, where the domains are determined based on the labels included in the query. The filtered search results are processed to ensure that certain portions of the results are from domains included in the filter. The results are further processed to include the query labels with certain ones of the results.

12 Claims, 5 Drawing Sheets

500 — Web Images News Froogle Maps more »

Google | cancer label:symtoms | Search | Advanced Search / Preferences

506

Web

| Diseases & conditions | Misc | Info type |
|---|---|---|
| Treatment | Research papers | From medical establishment |
| Symptoms | Support groups | Alternative medicine |
| Tests/diagnosis | Discussion | For medical professionals |
| Risk factors | | Images |

Clear refinements

502 — eMedicine Health: Cancer Symptoms
Cancer often has no specific symptoms, so it is important that you limit your risk factors and undergo appropriate cancer screening.
www.emedicinehealth.com/cancer_symptoms/article_em.htm - 24k -
504 — Cached - Similar pages - Remove result
Labeled Symptoms Tests/diagno... by Guha Roni 502 — Skin cancer symptoms, signs, prevention, and treatment and ...
Explains the different types of skin cancer (basel cell carcinoma, squamous cell carcinoma, and melanom), their symptoms, treatment and how to prevent skin ...
www.medicinenet.com/skin_cancer/article.htm - 65k -
504 — Cached - Similar pages - Remove result
Labeled Symptoms Treatment by Guha 502 — Bone Cancer - Symptoms, Treatment and Prevention
Symptoms, Treatment and Prevention of Bone Cancer. ... Diagnosis of Bone Cancer. The presenting symptom is usually pain. Pathologic fracture may be present ...
504 — www.healthscout.com/ency/1/76/main.html - 64k - Cached - Similar pages - Remove result
Labeled Symptoms Tests/diagno... Treatment ... by Guha

*FIG. 5*

FILTERING SEARCH RESULTS USING ANNOTATIONS

This application is a continuation application of, and claims benefit under 35 U.S.C. §120 to U.S. patent application Ser. No. 11/382,452, which was filed on May 9, 2006, the entire contents of which are hereby incorporated by reference.

FIELD OF INVENTION

This invention relates in general to search engines.

BACKGROUND OF INVENTION

The development of information retrieval systems has predominantly focused on improving the overall quality of the search results presented to the user. The quality of the results has typically been measured in terms of precision, recall, or other quantifiable measures of performance. Information retrieval systems, or 'search engines' in the context of the Internet and World Wide Web, use a wide variety of techniques to improve the quality and usefulness of the search results. These techniques address every possible aspect of search engine design, from the basic indexing algorithms and document representation, through query analysis and modification, to relevance ranking and result presentation, methodologies too numerous to fully catalog here.

An inherent problem in the design of search engines is that the relevance of search results to a particular user depends on factors that are highly dependent on the user's intent in conducting the search, that is, why they are conducting the search, as well as the user's circumstances, the facts pertaining to the user's information need. Thus, given the same query by two different users, a given set of search results can be relevant to one user and irrelevant to another, entirely because of the different intent and information needs. Most attempts at solving the problem of inferring a user's intent typically depend on relatively weak indicators, such as static user preferences, or predefined methods of query reformulation that are nothing more than educated guesses about what the user is interested in based on the query terms. Approaches such as these cannot fully capture user intent because such intent is itself highly variable and dependent on numerous situational facts that cannot be extrapolated from typical query terms.

In part because of the inability of contemporary search engines to consistently find information that satisfies the user's information need, and not merely the user's query terms, users frequently turn to websites that offer additional analysis or understanding of content available on the Internet. For the purposes of discussion these sites are called vertical knowledge sites. Some vertical knowledge websites, typically community sites for users of shared interests, allow users to link to content on the Internet and provide comments or tags describing the content. For example, a site may enable a user to link to the website of an automobile manufacturer, and post comment about a particular car being offered by the manufacturer; similarly, such a site could enable a user to link to a news report on the website of a news organization and post comment about the report. These and other vertical knowledge sites may also host the analysis and comments of experts or others with knowledge, expertise, or a point of view in particular fields, who again can comment on content found on the Internet. For example, a website operated by a digital camera expert and devoted to digital cameras typically includes product reviews, guidance on how to purchase a digital camera, as well as links to camera manufacturer's sites, new products announcements, technical articles, additional reviews, or other sources of content. To assist the user, the expert may include comments on the linked content, such as labeling a particular technical article as "expert level," or a particular review as "negative professional review," or a new product announcement as "new 10 MP digital SLR." A user interested in a particular point of view, type of information, or the like then search within the domain of such a site for articles or links that have certain associated labels or comments. For example, a user could search the aforementioned digital camera site for all camera reviews labeled "digital SLR."

However, while such vertical knowledge sites provide extensive useful information that the user can access to address a particular current information need, the problem remains that when the user returns to a general search engine to further search for relevant information, none of the comments or labels provided by the users of vertical knowledge site is made available to the search engine. As a result, a user cannot search generally for content that has been labeled or otherwise use the existence of such commentary to organize search results. Thus, none of the additional information that is expressed in the vertical knowledge site is available to the general search engine in order to provide more meaningful search results.

Search engines that can search for both query terms and labels on documents have been proposed. However, a problem with such a search engine is that if the comments or labels provided by a user are always used to limit the search results, many documents that are otherwise relevant to the query but simply not commented or labeled would be excluded from the results, thereby not providing overall the most relevant documents to the query.

SUMMARY

In one embodiment, a search engine is adapted to receive a search query that includes one or more query terms and one or more labels. The query terms are keywords of interest to the user; the labels are words that the user desires to be found in comments or tags associated with documents matching the query terms. For example, a search query may include the query term "digital camera" and the label "professional review." Search results in a response to a search query are automatically selected to include both the most relevant documents to the query terms and relevant documents that have labels that match the query labels.

In one embodiment, a search engine system receives a search query from a user, where the query comprises one or more query terms and one or more labels. A domain filter is created based on selecting annotations which have labels that match the query labels, and using the domains identified in the matching annotations as the domains for the filter. A search engine processes the query and domain filter to create a set of search results that are relevant to the query terms and for which a selected portion of the search results satisfy the domain filter, in that such portion of the documents come from domains in the filter. The search results are then further processed to produce a search result set in which a selected portion of the documents are associated with labels that match the query labels. The search results are then ranked using the label matches as weighting factors. The final result set is provided to the user, as a set of search results that are relevant to the query terms and which include some portion of results that match the query labels.

The construction of the domain filter may be done with a Bloom filter approach, using domain prefixes from annotations. The domain filter will have a small false positive rate as a result, and thus the first set of search results will contain documents that come from the domains that match the query labels, but which themselves do not satisfy the complete URL pattern for an annotation. Thus, the further processing of the search results determines whether the documents are associated with the query labels, e.g., by matching each document's URL against a URL pattern for the label, ensures that at least some of the results do in fact satisfy the query labels. In another aspect of using the domain filter, a minimum portion of the search results are ensured to be from domains that match the domain filter.

The present invention also has various embodiments, including as a computer implemented process, as computer apparatuses, as integrated circuits, and as computer program products that execute on general or special purpose processors.

The features and advantages described in this summary and the following detailed description are not all-inclusive. Many additional features and advantages will be apparent to one of ordinary skill in the art in view of the drawings, specification, and claims hereof.

BRIEF DESCRIPTION OF THE DRAWINGS

FIG. 5 illustrates an example of search results including labels.

The figures depict various embodiments of the present invention for purposes of illustration only. One skilled in the art will readily recognize from the following discussion that alternative embodiments of the illustrated and described structures, methods, and functions may be employed without departing from the principles of the invention.

DETAILED DESCRIPTION

System Overview

Figure 1:
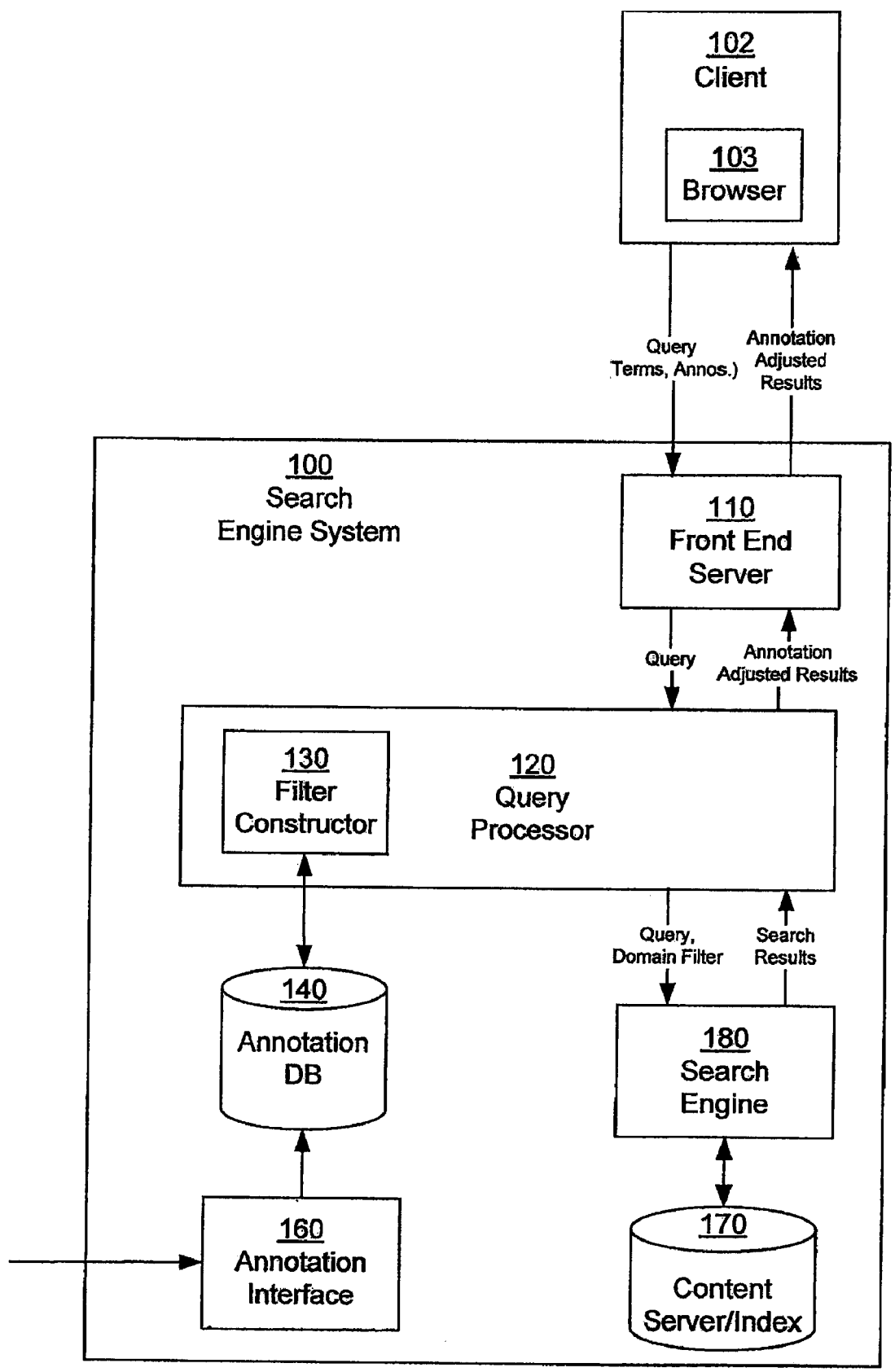
FIG. 1 illustrates a generalized system architecture for a search engine.

Referring to FIG. 1, there is shown a system architecture for a search engine system in accordance with one embodiment. In this system architecture, there is a client device 102 and search engine system 100. The search engine system 100 comprises a front end server 110, a query processor 120, filter constructor 130, a search engine 180, a content server 170, an annotation database 140 and an annotation interface 160. The figure does not show a number of conventional components (e.g. network, firewalls, routers, domain name servers, load balancers, etc.) in order to not obscure the relevant details of the embodiment.

The overall system operation is described as follows. A front end server 110 provides the basic interface for receiving search queries and providing search results to the clients 102. Generally, a query comprises one or more query terms and one or more labels. The query processor 120 is adapted to receive a query from the front end server 110 and pass the query, along with a domain filter based on the labels to the search engine 180. The domain filter is created based on selecting annotations in the annotation database 140 that have labels that match the query labels and using the domains identified in these matching annotations. The search engine 180 processes the query and domain filter (if received) and returns to the query processor 120 a set of search results that are relevant to the query terms and for which a selected portion of the search results satisfy the domain filter, in that the selection portion of documents are from domains included in the filter. The query processor 120 further processes the search results to produce a result set in which a selected portion of the documents have labels that match the query labels. The query processor 120 then reranks the result set using the label matches, and provides the final result set to the front end server 110. The front end server 110 returns the ranked results to the client 102.

The embodiments of the system make use of an annotation database 104. The annotation database 104 contains a large collection of annotations. Generally, an annotation includes a pattern for a uniform resource locator (URL) for the URLs of documents, and a label to be applied to a document whose URL matches the URL pattern. Schematically, an annotation may take the form:

<label, URL_pattern> where label is a term or phrase, and URL_pattern is a specification of a pattern for a URL.

For example, the annotation

<"professional review", www.digitalcaeteraworld.com/review/> would be used to apply the label "professional review" to any document whose URL includes a prefix matching the network location www.digitalcameraworld.com/review/; all documents in this particular host's directory are considered by the provider of the annotation to be "professional reviews" of digital cameras. In one embodiment, the URL pattern can include wildcards as well as regular expressions. The term "document" is used herein to refer to any and all types of content that can be accessed by a client over a network.

In a typical embodiment, the annotation database 104 includes thousands, even millions of such annotations. There is a many-to-many relationship between labels and URL patterns, in that a given label may be applied to any document matching multiple different URL patterns, and a given URL pattern may be associated with many different labels.

Even with millions of annotations which may match hundreds of millions of documents, there is a potential problem in that only a relatively small number of documents that are relevant to a given search query may likewise match the query labels. This is because where there are billions of documents available to the search engine 180, the likelihood of a query-term relevant document also matching a query label is overall quite low. Thus, if the search results are artificially constrained to include only such documents, then other relevant documents will be excluded. The various embodiments overcome this problem, as described below.

The client 102 can be any type of client, including any type of computer (e.g., desktop computer, workstation, notebook, mainframe, terminal, etc.), handheld device (personal digital assistant, cellular phone, etc.), or the like. The client device 102 need only have the capability to communicate over a network (e.g. Internet, telephony, LAN, WAN, or combination thereof) with the search engine system 100. Typically, a client device 102 will support a browser application 103, and the appropriate networking applications and components, all of which are known to those of skill in the art.

The front end server 110 is adapted to receive a query from the client 102 and pass it to the query processor 120, and then subsequently receive the search results back from the query processor 120 and provide them to the client 102. The front end server 110 is further adapted to handle the queries from multiple different clients 102 concurrently.

Generally, a query comprises one or more query terms and one or more labels. For example, a query may be digital camera more: professional review where the terms "digital camera" are the query terms, and the token "more:" indicates that the following term is a label of interest. Thus, in this example, the user is searching for documents that have been labeled (by one or more individuals, such as other users, experts, etc.) as being professional reviews of digital cameras.

Another example would be the query abortion label: statistics label: pro-choice.

In this example, the user would be searching for documents that relevant to abortion and had been labeled as either statistics or pro-choice related. The particular syntax used to indicate labels (as differentiated from query terms) is not limited to the use of "label:" and other tokens and formats can be used as well. For example, the query can take the form such as abortion label:(statistics pro-choice)

where the terms in the parenthetical label are the labels of interest (as disjuncts).

The query processor 120 has two primary responsibilities: a pre-query operation of constructing a domain filter for queries that include labels, and post-query operation of verifying the search results and reranking them. First, the query processor 120 receives a query from the front end server 110 and determines if it includes any labels. If no labels are present, then query is passed to the search engine 180. Labels can be identified by specific token such as "label", or other syntactic devices (e.g., parenthetical, symbols such as "*", or the like). The query processor 120 includes a parser that performs the initial parsing of the query into query term and labels. Where there are one more labels in query, the query processor 120 constructs a domain filter that identifies the domains of documents known to the search engine system 100 to have labels that match the query labels. The query processor 120 passes the domain filter and the query terms from the query to the search engine 180. The post-query operation of the query processor 120 is discussed below.

Generally, the search engine 180 performs a search on the query terms and returns documents relevant to the query. The search engine 180 can use any type of information retrieval model for selecting relevant documents. One suitable information retrieval model is a link-based model, such as PageRank which is described in U.S. Pat. No. 6,285,999, and incorporated by reference herein. Where the search engine 180 receives the domain filter it performs an additional filtering function on the search results by including a predetermined minimum portion (e.g., number or percentage) of documents in the search results which are from domains identified in the domain filter. The search results are passed back to the query processor 120.

The query processor 120 receives from the search engine 180 the set of search result documents that are relevant to the query terms, and which include the predetermined minimum portion of documents that come from one or more of the domains identified in the domain filter. The query processor 120 then determines the labels applicable to the search result documents according to the URL patterns for the query labels. The query processor 120 then reranks the matching documents using the presence of the labels on certain documents as weighing factors. The reranked documents are provided to the front end server 110, which passes them back to the client 102.

FIG. 5 illustrates an example of search query including a label and corresponding search results. Search query field 506 is shown including a search query 500 that include the query term "cancer" and the indicated label "symptoms." This query has been provided to the search engine system 100, and some of the search results 502 (documents) as shown in ranked order. Of interest in each search result 502 is the indicia of the matching label "symptom" for each shown search result, as well as other labels such as "Tests/diagnosis," and "Treatment." These search results have been filtered using a domain filter, and then ranked based on weights determined based on the labels.

Domain Filter Construction

The query processor 120 is responsible for constructing a domain filter that identifies the domains associated with the particular labels include in the user's query. In the illustrated embodiment, this function is handled by the filter constructor 130. The domain filter preferably has a compact representation that can be used to quickly determine whether a domain for a given search result is included in the domain filter.

Figure 2:
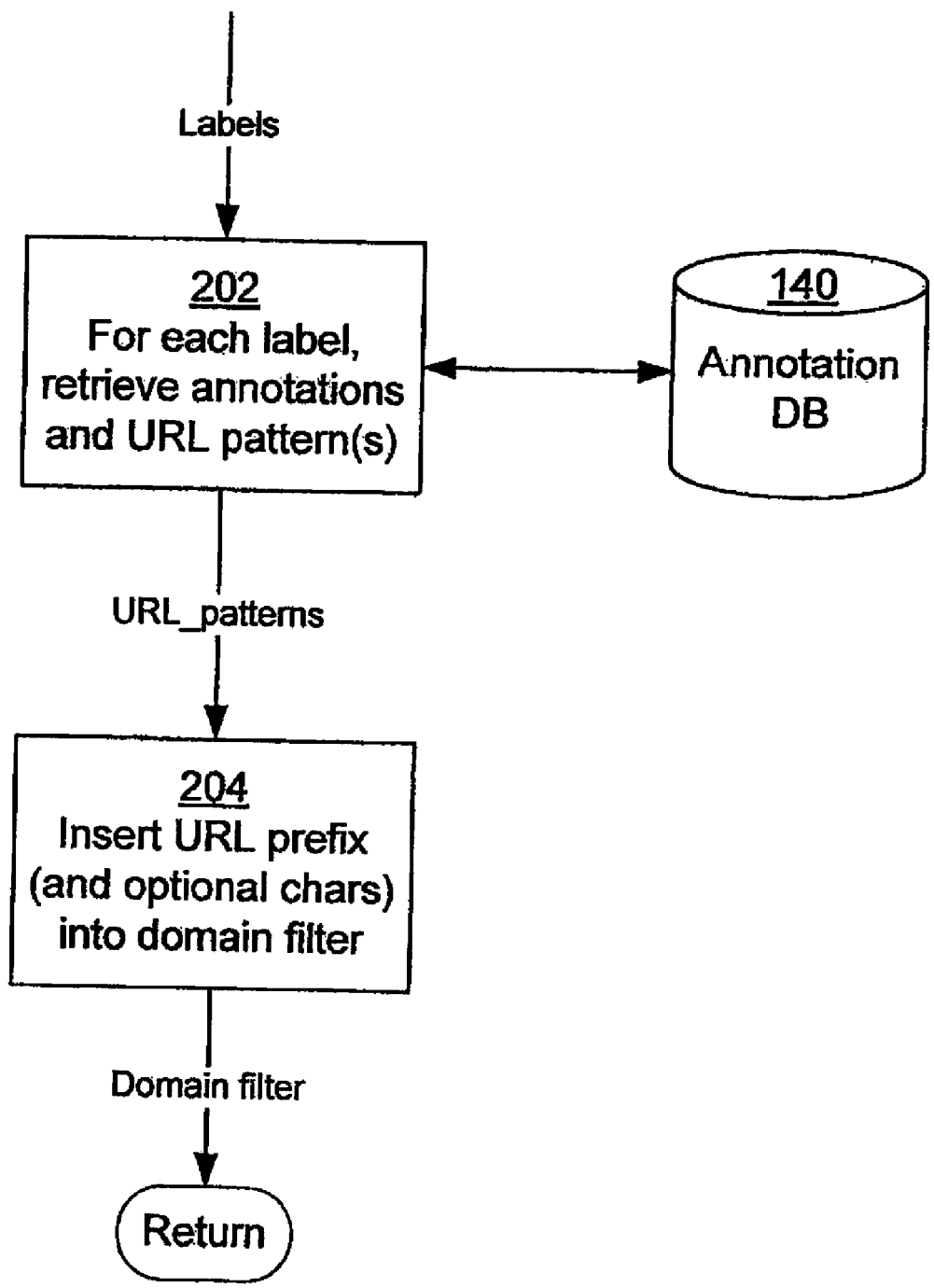
FIG. 2 is a flowchart of a method for constructing a domain filter.

FIG. 2 illustrates a general process for construction of the domain filter by the filter constructor 130. The filter constructor 130 receives as input the set of labels from the query. As indicated above, the annotation database 140 includes a collection of annotations, where each annotation comprises a label and a URL pattern. The annotation database 140 includes an inverted index (or equivalent) that indexes each annotation to whatever URL patterns have been defined for it (whether by the same or different authors). Accordingly, for each label in the query, the filter constructor 130 looks up 202 the associated URL pattern. In one embodiment, the domain prefix is extracted from the URL pattern and added 204 to the domain filter. For example, if the URL pattern is "www.bookstore.com/fiction/historical/" then the URL prefix is "www.bookstore.com." The domain prefix that is added to the domain filter can be extended up to some number of additional characters in the URL pattern. Thus, the domain prefix could be extended to an additional five characters, such as "www.bookstore.com/ficti." The domain filter is preferably structured so as to include only one instance per unique domain, in order to reduce the filter size.

The use of less than the entire URL pattern when constructing the domain filter has the advantage of providing a very compact representation of the domains contained in the annotations. This is because for a given domain, such as "www.bookstore.com," there could be hundreds, even thousands of individual URL patterns in the annotation database. Given that they all come from the same domain, it is beneficial to provide a domain filter that can represent all (or some portion) of the annotations for that domain in a relatively small number of entries. However, because the entire URL pattern is not used, it is possible that some search results will be false positives when recognized as being in the same domain as annotations for matching labels. The post-query operation of the query processor 120 to verify the domains of the search results resolves this concern.

In one embodiment, the domain filter is implemented as a Bloom filter. As known to those of skill in the art, a Bloom filter is a space-efficient probabilistic data structure that is used to test whether an element is a member of a set. Here, the Bloom filter is used by the search engine 180 to test whether the domain of a particular search result is included in the URL patterns for labels that match the query labels.

One particular implementation of the domain filter in a Bloom filter is as follows. A simple Bloom filter can be characterized by the bit array of length L, and a number K of hash function H used to hash entries into the bit array. The number K is based on the number P of different entries to be included in the filter, and the filter length, and a desired false positive rate. The optimization of K based on P, L and the false positive rate is described in the literature. One known optimization is to set K as $$K=\text{Int}(\ln 2(L/P))$$

In one embodiment the filter length L is 1024 bits. P is the number of different domains prefixes that are associated with the query labels. Thus, P is determined after the query labels are matched in the annotation database 104 and the set (and hence number) of corresponding domains prefixes D are identified. K is then determined based on L and P.

In one embodiment, the K hash functions are based on Jenkin's hash function LOOKUP2. The hashes are done as follows, on each domain prefix that is to be inserted into the domain filter. First, a 64 bit hash is taken of the domain prefix, using a Jenkins hash. Then for each of the K hash functions that are needed, this 64 bit hash is rotated by 8*i, where i is the index of the hash function, and then modded by the bit vector size. The result is then set at the appropriate bit. The resulting domain filter (or a handle thereto) is then passed to the search engine 180.

Filtering the Search Results with the Domain Filter

As described above, the search engine 180 receives the domain filter and uses it during selection of the search results to filter a first search result set, here designated S This filtering operation is done by matching the domain prefix (with or without character extension, as required) of the documents in the search result set S to the domain prefixes included in the domain filter. The resulting set of filtered search results is designated S_filtered In one embodiment, the filtering is performed to ensure that a predetermined minimum portion of the search results S filtered match those in the filter. The minimum portion M can be specified as a percentage of the documents, for example 25%; thus if 1000 documents are to be returned in S_filtered, it may be desired to have 250 of them from the matching domains. Any proportion of the search results can be set as the minimum percentage.

Figure 3:
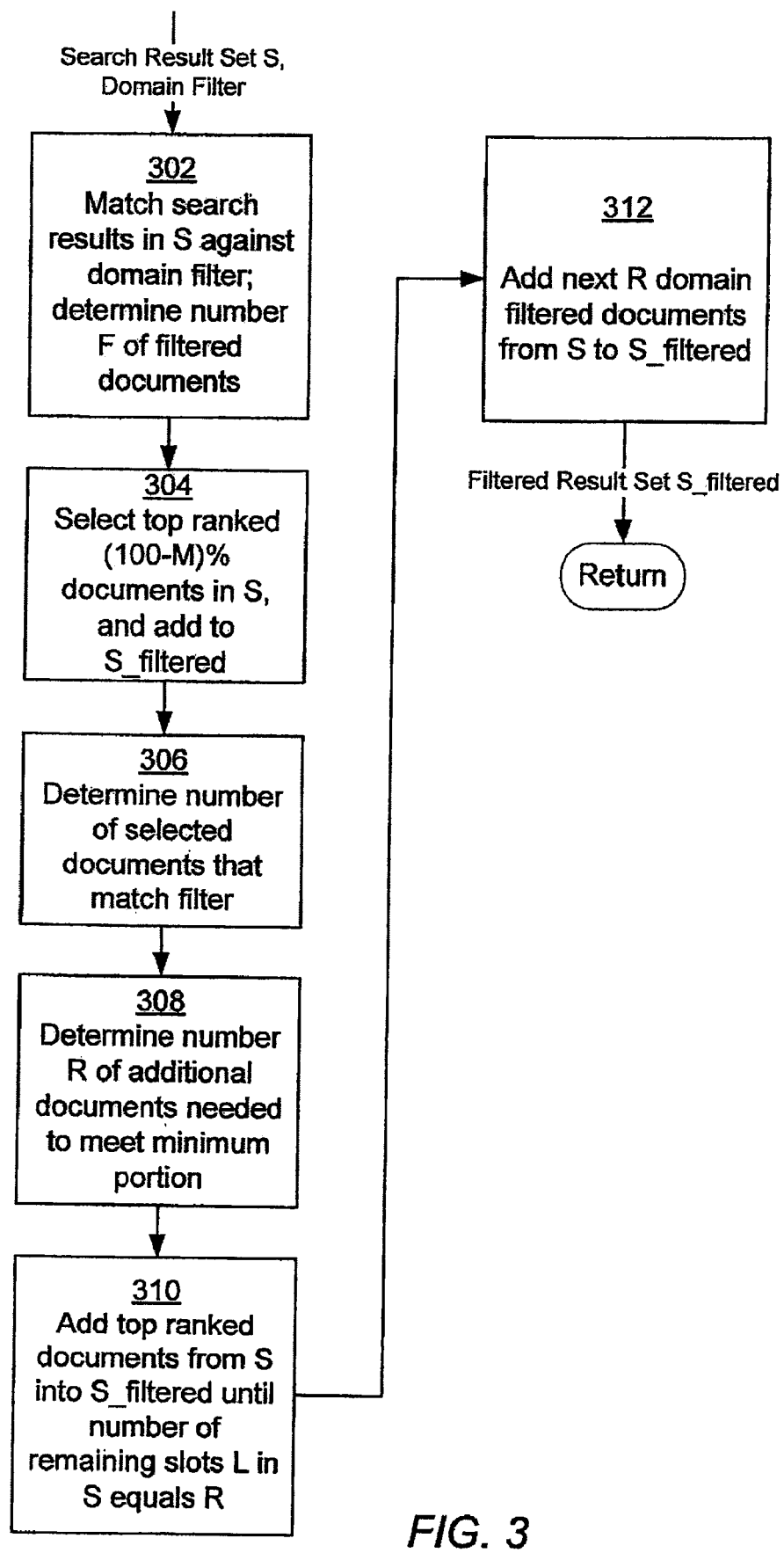
FIG. 3 is a flowchart of a method for filtering search results using the domain filter.

FIG. 3 illustrates one embodiment for filtering of search results with the domain filter. First, it is assumed that the search result S is ranked based on the search engine's own relevance ranking algorithm, typically based on an information retrieval score as well as other factors (e.g., inbound and outbound link structure, personal preferences, language, domain, etc.).

Each document in S is matched 302 against the domain filter to determine if the document's domain prefix is included in the domain filter. Where the domain filter is a Bloom filter as described, then the document's domain prefix is hashed into the domain filter using the K hash functions. This step also determines the total number F of domain filtered documents in S.

Where the domain filter is constructed using domain prefixes plus some additional number of characters (e.g., 12 characters), then the hashing process is repeated as follows. The additional number of characters is defined as the domain extension E. A stride value is a defined as a factor of the extension E. For example, if the domain extension is 12, then stride value of 3 may be selected. For testing whether the domain of a given search result in S matches the filter, the hash functions K are repeated on the string comprising the domain prefix plus (stride*i) characters, where i is incremented from 1 to (E/stride). This operates to quickly test a number of variants of the domain of a document, from the domain prefix up to the full extended prefix.

The search engine 180 selects 304 the top (100−M) % documents from S; for example, to return 1,000 documents with a minimum of 25% matching the domain filter, the search engine 180 selects the first 750 top ranked documents (75%) in S for inclusion in S_filtered. This leaves 250 "slots" (L) available in S_filtered.

Of these selected (100-M) % documents, it is determined 306 how many match the domain filter. This number is subtracted from the required number of documents to determine 308 how many more filtered documents (R) need to be added to S_filtered to reach the minimum required portion. Thus, if there are 150 documents in the first 750 documents, then only 100 more filtered documents are required.

Beginning then with the next ranked document in S, the top ranked documents are added 310 to S_filtered. If the added document is a domain filtered document, then R is decremented, otherwise R is not decremented. This is done to keep a running count of how many domain filtered documents are currently in S_filtered. The number of slots L is also decremented and compared to R. This loop is repeated until L, the number of slots remaining in S_filtered is equal to R. At that point, only the next R documents in S that are also domain filtered documents are added 312 in S_filtered. The resulting set S_filtered is returned to the query processor 120.

Continuing the above example, after the first 750 documents are added to S_filtered, recall that 100 more documents were needed. As additional documents are added 310 to S_filtered which do match the domain filter, R is decreased. Assume that after another 200 documents are added in S_filtered (so that there are now 950 documents), and of those, 50 matched the domain filter. That would leave 50 slots (L) still available in S filtered, and 50 domain filtered documents (R) still needed to meet the minimum required portion. Thus, continuing through the ranked documents in S, only domain filtered documents are selected and added 312 to S_filtered. These documents k will still be added in rank order, but some higher ranked documents will be skipped because they do not match the domain filter.

Search Result Verification and Reranking

As described above, the query processor 120 receives from the search engine 180 S filtered, which is set of search results containing documents that are relevant to the query terms, and which include the minimum portion of documents that come from the domains identified in the domain filter. At this point, the result set is over-inclusive, in that it includes documents that may not satisfy the annotation criteria (e.g., in terms of URL patterns) for the query label terms, even though they come from the same domains as the query labels. Accordingly, the query processor 120 then determines which the documents in the filtered search result set S_filtered have URLs that match the URL patterns for the query labels. For each such match, the query processor 120 includes indicia with such documents indicating the appropriate-labels. The query processor 120 then reranks the matching documents using the presence of the labels as weighting factors, and constructs the final result set S final to be returned to the client.

Figure 4:
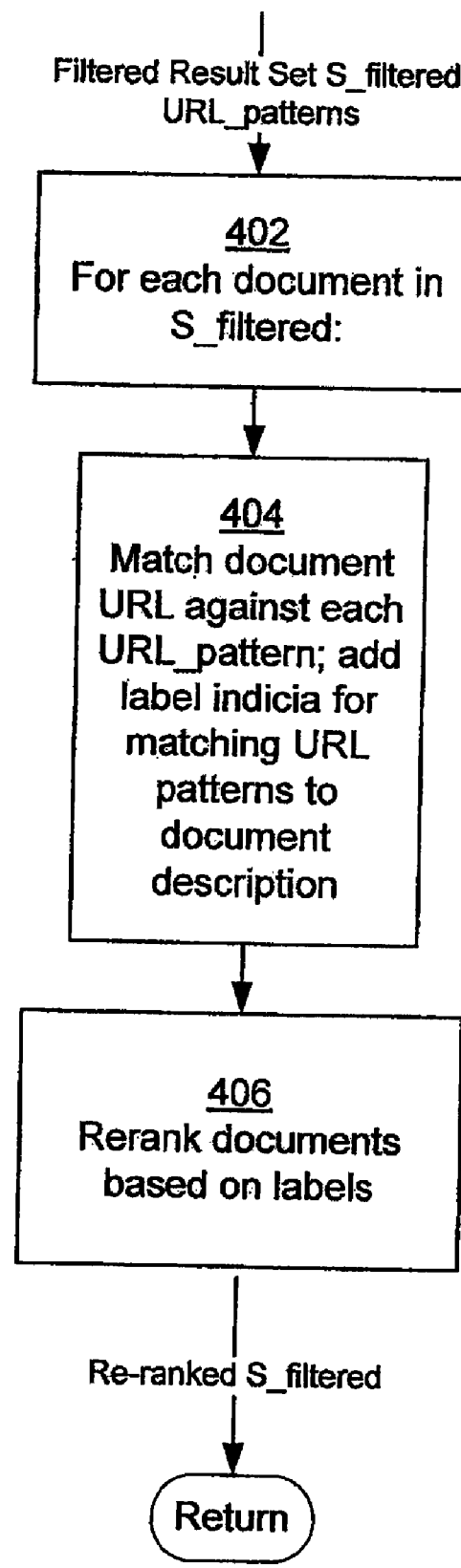
FIG. 4 is a flowchart of a method for post-processing the search results to verify domains and include labels.

FIG. 4 illustrates one embodiment of this process in more detail. As indicated above, the query processor 120 has the actual URL patterns of the annotations that match the query labels. For each document (402) in the search results S_filtered, the query processor 120 matches 404 the document's URL against the URL patterns in the annotations. The query processor 120 augments the document's description with the label text (or other similar indicia, e.g., icons, images, media buttons).

For example, if one query label is "professional review", and its URL pattern is "www.digitalcameraworld.com/review/," then a document in S_filtered with the URL "www- .digitalcameraworld.com/review/casio ZR850.htm" would receive the label "Professional review" (or some other useful indicia) as additional indicia in the final search results. However, if there is another query label "industry news" with the URL pattern "www.digitalcameraworld.cominews/" then the above document would not receive this label.

After the search results S_filtered have been labeled 404, the query processor 120 reranks the documents, using the presence of a label (or multiple labels) for document as a weighting factor for an information retrieval score of the document. A variety of different weighting schemes can be used, with the beneficial requirement that the presence of at least one label operates to increase (up-weight) the information retrieval score of the document. A simple weighting scheme is to multiply the information retrieval score by a weight greater than 1 (e.g., 2) when there is at least one label associated with a document. This approach increases the relevance of labeled documents in general, but does not distinguish between the relevance of documents based on their labels.

Another scheme would be to multiply the information retrieval score by a weight greater than 1 for each label that is present; e.g., the information retrieval score T for a document would be $Tw^n$, where w is the weighting factor and n is the number of labels on the document. This approach increases the relevance of a document as the number of labels on the document increases. This approach can be adjusted to make the first matching label the most significant, and decay the weights for additional labels (e.g., linear, exponential, or other decay rates).

A further approach is to associate each label with its own weight, either as determined by the provider of the annotation, or determined by the search engine system. The associated weights for the labels applied to each document are then used to adjust the information retrieval score for the document. For example, the provider of the annotation for URL pattern "www.digitalcameraworld.com/news" can specify a weight of 1.5 for the label "Industry news" and a weight of 1.8 for the label "Professional review" for the URL pattern "www.digitalcameraworld.com/review/." The search engine system can use these weights directly, or normalize them against the weights of other annotation sources.

The reranked set of search results S_filtered is then returned to the front end server 110, which passes the result back to the client 102.

In discussion of the various embodiments, examples have been discussed using search queries including a single query term and a single label, as well as examples referencing individual documents. It is understood that the embodiments and invention are not so limited, and should be generally understood as equally operable with queries including a plurality of query terms and a plurality of labels. Thus any reference herein, including in the claims below, to various words in the singular noun form, such as query term, label, annotation, document, filter, and so forth, are not intended to be limited to the singular, but should be read as including at least one or a plurality thereof, unless such a construction is expressly indicated as not intended or appropriate for the circumstances.

The present invention has been described in particular detail with respect to one possible embodiment. Those of skill in the art will appreciate that the invention may be practiced in other embodiments. First, the particular naming of the components, capitalization of terms, the attributes, data structures, or any other programming or structural aspect is not mandatory or significant, and the mechanisms that implement the invention or its features may have different names, formats, or protocols. Further, the system may be implemented via a combination of hardware and software, as described, or entirely in hardware elements. Also, the particular division of functionality between the various systems components described herein is merely exemplary, and not mandatory; functions performed by a single system component may instead be performed by multiple components, and functions performed by multiple components may instead be performed by a single component.

Some portions of above description present the features of the present invention in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "calculating" or "determining" or "identifying" or the like, refer to the action and processes of a computer system, or similar electronic computing device, that manipulates and transforms data represented as physical (electronic) quantities within the computer system memories or registers or other such information storage, transmission or display devices.

Certain aspects of the present invention have been described using commands, mnemonics, tokens, formats, syntax, and other programming conventions. The particular selection of the names, formats, syntax, and the like are merely illustrative, and not limiting. Those of skill in the art can readily construct alternative names, formats, syntax rules, and so forth for defining context files and programming the operations a programmable search engine via context processing.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by real time network operating systems.

The present invention also relates to an apparatus for performing the operations herein. This apparatus may be specially constructed for the required purposes, or it may comprise a general-purpose computer selectively activated or reconfigured by a computer program stored on a computer readable medium that can be accessed by the computer. Such a computer program may be stored in a computer readable storage medium, such as, but is not limited to, any type of disk including floppy disks, optical disks, CD-ROMs, magnetic-optical disks, read-only memories (ROMS), random access memories (RAMs), EPROMs, EEPROMs, magnetic or optical cards, or any type of media suitable for storing electronic instructions, and each coupled to a computer system bus.

The algorithms and operations presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will be apparent to those of skill in the art, along with equivalent variations. In addition, the present invention is not described with reference to any particular programming language. It is appreciated that a variety of programming languages may be used to implement the teachings of the present invention as described herein, and any references to specific languages are provided for disclosure of enablement and best mode of the present invention.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the following claims.

We claim:

1. A method performed by a data processing apparatus, the method comprising:
   receiving a search query comprising one or more query terms and one or more labels;
   obtaining a plurality of search results responsive to the query terms, wherein each of the search results has a respective score and a respective uniform resource locator, and wherein the plurality of search results are ranked according to the respective scores;
   identifying one or more different domains from a plurality of uniform resource locator patterns associated with the labels;
   selecting a highest ranked plurality of first search results from the plurality of search results wherein a threshold number of the selected first search results have respective uniform resource locators that contain one of the identified domains;
   annotating each first search result of a plurality of the first search results with one or more of the labels that are associated with uniform resource locator patterns that match the respective uniform resource locator of the first search result;
   modifying the respective score of one or more of the annotated first search results wherein modifying the score of the annotated first search result comprises adjusting the score by a weight associated with a label annotation of the annotated first search result;
   ranking the annotated first search results based on the one or more modified scores; and
   providing the ranked annotated first search results as a response to the search query.

2. The method of claim 1, further comprising adjusting the score by a weight associated with a second annotation label of the particular search result.

3. The method of claim 1 wherein a particular uniform resource locator pattern of the plurality of uniform resource locator patterns includes one or more regular expressions.

4. The method of claim 1 wherein selecting the highest ranked plurality of first search results from the plurality of search results uses a Bloom filter that represents the one or more different domains.

5. A system comprising:
   one or more computers;
   a non-transitory computer-readable storage medium coupled to the one or more computers having instructions stored thereon which, when executed by the one or more computers, causes the one or more computers to perform operations comprising:
   receiving a search query comprising one or more query terms and one or more labels;
   obtaining a plurality of search results responsive to the query terms, wherein each of the search results has a respective score and a respective uniform resource locator, and wherein the plurality of search results are ranked according to the respective scores;
   identifying one or more different domains from a plurality of uniform resource locator patterns associated with the labels;
   selecting a highest ranked plurality of first search results from the plurality of search results wherein a threshold number of the selected first search results have respective uniform resource locators that contain one of the identified domains;
   annotating each first search result of a plurality of the first search results with one or more of the labels that are associated with uniform resource locator patterns that match the respective uniform resource locator of the first search result;
   modifying the respective score of one or more of the annotated first search results wherein modifying the score of the annotated first search result comprises adjusting the score by a weight associated with a label annotation of the annotated first search result;
   ranking the annotated first search results based on the one or more modified scores; and
   providing the ranked annotated first search results as a response to the search query.

6. The system of claim 5, further comprising adjusting the score by a weight associated with a second annotation label of the particular search result.

7. The system of claim 5 wherein a particular uniform resource locator pattern of the plurality of uniform resource locator patterns includes one or more regular expressions.

8. The system of claim 5 wherein selecting the highest ranked plurality of first search results from the plurality of search results uses a Bloom filter that represents the one or more different domains.

9. A non-transitory computer-readable storage medium encoded with a computer program comprising instructions that, when executed, operate to cause a computer to perform operations comprising:
   receiving a search query comprising one or more query terms and one or more labels;
   obtaining a plurality of search results responsive to the query terms, wherein each of the search results has a respective score and a respective uniform resource locator, and wherein the plurality of search results are ranked according to the respective scores;
   identifying one or more different domains from a plurality of uniform resource locator patterns associated with the labels;
   selecting a highest ranked plurality of first search results from the plurality of search results wherein a threshold number of the selected first search results have respective uniform resource locators that contain one of the identified domains;
   annotating each first search result of a plurality of the first search results with one or more of the labels that are associated with uniform resource locator patterns that match the respective uniform resource locator of the first search result;
   modifying the respective score of one or more of the annotated first search results wherein modifying the score of the annotated first search result comprises adjusting the score by a weight associated with a label annotation of the annotated first search result;
   ranking the annotated first search results based on the one or more modified scores; and
   providing the ranked annotated first search results as a response to the search query.

10. The non-transitory computer-readable storage medium of claim 9, further comprising adjusting the score by a weight associated with a second annotation label of the particular search result.

11. The non-transitory computer-readable storage medium of claim 9 wherein a particular uniform resource locator pattern of the plurality of uniform resource locator patterns includes one or more regular expressions.

12. The non-transitory computer-readable storage medium of claim 9 wherein selecting the highest ranked plurality of first search results from the plurality of search results uses a Bloom filter that represents the one or more different domains.

* * * * *